June 30, 1964     A. G. KUDELKO     3,139,511
FUSION CLADDING TECHNIQUE AND PRODUCT Filed May 18, 1961     2 Sheets-Sheet 1

INVENTOR
ARTHUR G. KUDELKO
BY
*Synnestvedt & Lechner*
ATTORNEYS

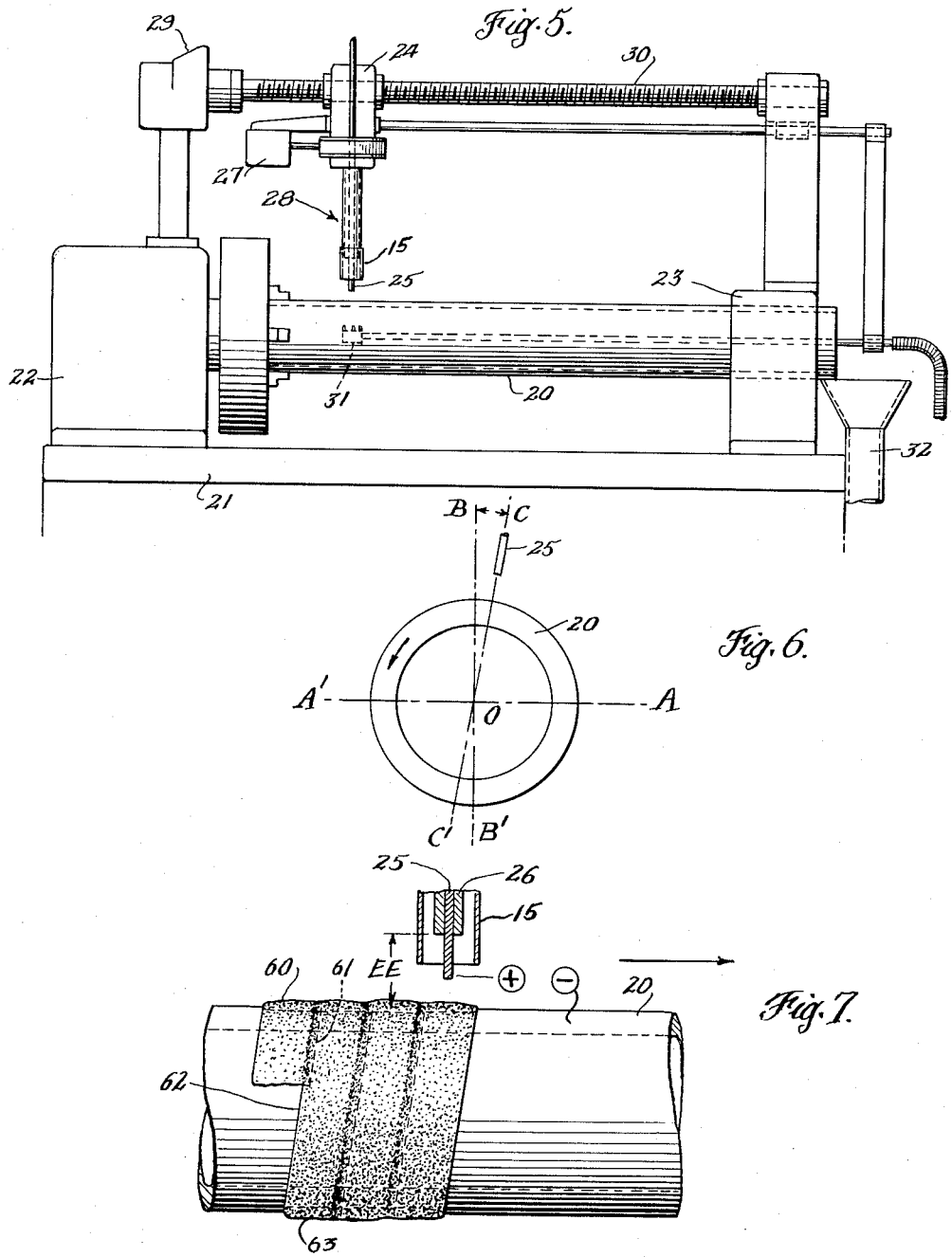

United States Patent Office 3,139,511
Patented June 30, 1964

3,139,511
FUSION CLADDING TECHNIQUE AND PRODUCT
Arthur G. Kudelko, Glenside, Pa., assignor to Standard Pressed Steel Co., Jenkintown, Pa., a corporation of Pennsylvania
Filed May 18, 1961, Ser. No. 111,072
9 Claims. (Cl. 219—76)

This invention relates to a modified fusion cladding technique and to the fusion clad composites thereby produced.

Heretofore, in conventional cladding operations, one or more layers of an alloy steel, a corrosion resistant material, or a metal having specially desired chemical properties was deposited by welding on a base metal, usually low carbon steel. Various companies have developed automatic welding machines and techniques for laying the weld metal on the base. One such machine is described in the Welding Journal for December 1960 at pages 1222 et seq. This equipment can be generally described as a gas shielded, metal arc welding machine employing D.C. reverse polarity current. However, the equipment employs a so-called "extended electrode" and is provided with means to impart convelinear (constant velocity) oscillating motion to the torch or welding head during the laying of the bead.

The use of the "extended electrode" technique decreases the degree of the weld metal penetration and also increases the deposition rate due to the pre-heating of the electrode wire by means of the $I^2R$ effect (resistance heating).

The use of convelinear oscillation in the laying of a bead of weld metal gives a much more uniform degree of weld metal penetration than is obtained with a manually laid bead or with a bead laid with substantially sinusoidal oscillation of the torch.

Heretofore, it has not been considered to be metallurgically feasible to reverse the conventional fusion cladding procedure and apply a carbon steel weld metal coating to a corrosion resistant base metal. Among the reasons given was the fact that manual attempts to do so necessitated the employment of temperatures and conditions which resulted in an unusually high degree of penetration of weld metal 11 into the base 10: i.e., the ratio of the depth of penetration ($d$, FIG. 1) to bead height ($h$, FIG. 1) was too high. The dilution of the weld metal with the alloy by the penetration resulted in hardening and change in chemistry and physicals of the weld bead to an objectionable degree. With the advent of the extended electrode and convelinear oscillation of the torch it became apparent that the problem of excessive penetration could be overcome. However, a more fundamental objection still continued to exist, namely, the fact that when low carbon steels are employed as weld metals, they are porosity prone and overlays produced therefrom employing MIG (metal-inert gas) techniques were so excessively porous due to gas holes that it was impossible for the weld produced therefrom to meet the rigid porosity standards which have recently been established in various federal specifications. Further, the final product was not sufficiently slag free to pass radiographic inspection.

Accordingly, it is one of the objects of this invention to provide a process which will enable the production of "clean" (i.e., substantially free of porosity and slag inclusions) fusion clad carbon steel weld metal overlays on a corrosion resistant base such as stainless steel, Monel, Inconel and the like.

It is another object of this invention to provide a fusion clad composite of carbon steel weld metal overlays on a corrosion resistant base which is substantially free of porosity and slag inclusions.

It is another object of this invention to provide techniques for the production of fusion clad carbon steel weld metal overlays on corrosion resistant base metals wherein the depth of penetration of the weld metal is substantially uniform and the ratio of the depth of penetration to the bead height is not greater than about ⅓ the height of the weld metal bead.

Still other objects and advantages of the invention will appear in the ensuing description thereof.

From a procedural standpoint, the objectives of the invention are obtained by applying the carbon steel weld metal overlay by a gas shielded, metal arc welding process employing D.C. reverse polarity current and provided with an extended electrode which is oscillated, substantially convelinearly, in a direction generally transverse to the direction in which the weld bead is being laid; and to insure the production of clean (essentially defect free to radiographic inspetcion) overlays, the oxygen content of the gas shield should be adjusted and controlled within limits to be subsequently described and also the "torch position" employed should also be adjusted and controlled, in the manner described and illustrated hereinafter.

To facilitate an understanding of the technique of the present invention and the product produced thereby reference will be made to the drawings which include the following illustration:

FIGURE 5 is a schematic illustration of a gas shielded, metal arc welding machine in which the torch is in the form of an extended electrode and the welding head is adapted for convelinear oscillation.

FIGURES 6 and 7 illustrate schematically the circumferential offset and positioning of the torch (electrode) in accordance with this invention.

Figure 1:
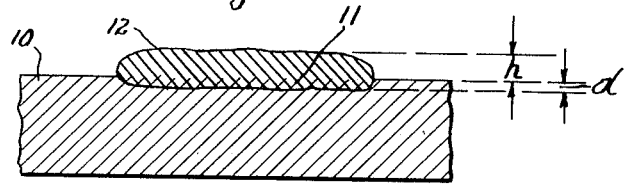
FIGURES 1, 2a and 2b are cross sectional views showing weld metal overlays on a base metal member.

For illustrative purposes the invention will be described in connection with the production of a low carbon steel overlay on a tube of stainless steel, it is not, however, intended to thereby limit the scope of the invention and it will be understood that the invention can be readily applied to the cladding of other shapes and the employment of various types of metals as the base material to be cladded.

Referring now to FIGURE 5, a stainless steel tube 20 is mounted in a lathe like mechanism 21 provided with means 22 for rotating the tube about its longitudinal axis; the equipment is provided with suitable current contactors to connect the work piece 20 with the negative pole of a D.C. power supply. The machine is also provided with a steady rest 23 to maintain the centering of the rotating tube. The welding head assembly 24 includes: an electrode 25 of the so-called "extended type," a current contact tube 26 (see FIG. 7) connected to the positive pole of a D.C. current supply (not shown), an adjustable gas nozzle 15 for controlling the inert gas shield, means (not shown) for supplying shielding gas to the nozzle, a weld wire straightener and feeder system (not shown) and means 27 for oscillating the welding torch 28 and electrode 25. The oscillator includes suitable means for varying the length of stroke, the rate of oscillation and the period of dwell at either or both ends of the stroke.

The welding head assembly is mounted on rod 30 and adapted for movement in directions generally paralleling the longitudinal axis of tube 20. A variable indexing mechanism 29 enables controlling and interrelating the longitudinal progression of the torch head to the speed of rotation of the tube.

A water spray 31 is positioned within tube 20 and is adapted to follow longitudinal movement of the welding head and spray cooling water against the inner wall of the portion of the tube on which the spool of weld metal is being formed. Water from inside the tube drains to a sump through collector 32.

As used herein the terms "extended electrode" and "electrode extension" are used interchangeably and refer to the distance between the work piece and the last point at which the electrode is in contact with the current pick-up tube. In FIGURE 7, the current pick-up tube is item 26 and the dimension EE represents the electrode extension.

In the carry out of the special cladding techniques according to the present invention on equipment of the type generally described heretofore conventional electrode extensions are employed and, except for the circumferential offset given the torch and the control of the $O_2$ content of the gas shield, other operating conditions are more or less, essentially the same as those employed in welding with alloy steel weld wire, or with any corrosion resistant weld wire.

When the foregoing equipment is to be used in accordance with the present invention, it is preferred to circumferentially offset the electrode. This offset can be seen in FIGURE 6.

The angular offset (BOC in FIGURE 6) to be employed will vary with many factors including the surface speed of the tube, the diameter of the tube, the type and diameter of the weld wire, the current, the electrode extension, the heat dissipating properties of the base metal, etc. However, for any particular set of working conditions, it is desired that the angular offset BOC be such that when the weld metal pool formed at point X moves to the general vicinity of point Y (on the vertical axis) the metal should have lost its fluidity and be in a shape sustaining state. In other words, the weld metal should be solidified before it passes the point where it will form a pool of uneven thickness due to its flowing as it rotates away from the vertical axis. This, as to a given bead, assists in maintaining a substantially uniform degree of penetration of the weld metal in the base metal.

Figure 2A:
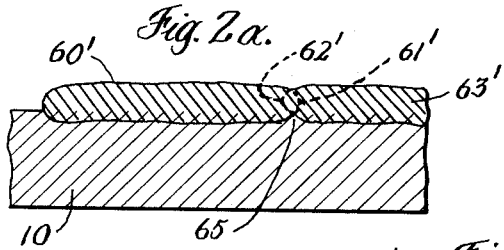
Figure 2B:
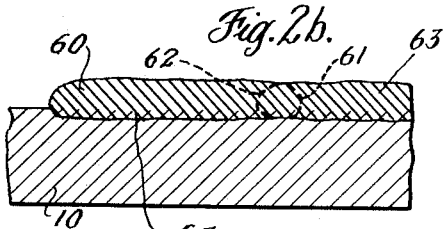

As can be seen in FIGURE 7, when the base is in tubular form, the overlay is formed by a bead of weld metal 60 which is wrapped as a continuous spiral or helix about the surface of the tube 20, and in the formation of the weld bead helix the forward or leading edge 61 of the bead is overlapped by the trailing edge 62 of the next helical turn 63. The extent of overlap is important from the standpoint of strength in the ultimate finished article. The overlap should be sufficient so that the depth of weld metal penetration is substantially uniform and constant in the fusion area and the composite should be free of notches or stress risers. This aspect is illustrated in FIGURES 2a and 2b. FIGURE 2a shows a situation where there is a notch or stress riser 65 formed because the adjacent beads 60' and 63' are not sufficiently overlapped. The stress riser is a point of weakness and should be avoided. FIGURE 2b shows beads 60 and 63 overlapped to prevent forming the stress riser and giving a substantially uniform depth of penetration 64 in the fused area.

Figure 3:
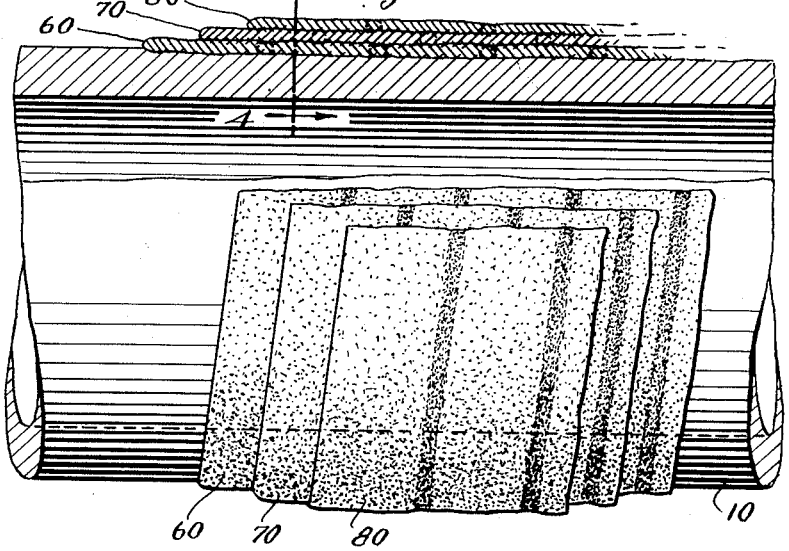
FIGURE 3 is a side elevation, partly in section, showing the production of a multilayer overlay composite on a tube of base metal.
Figure 4:
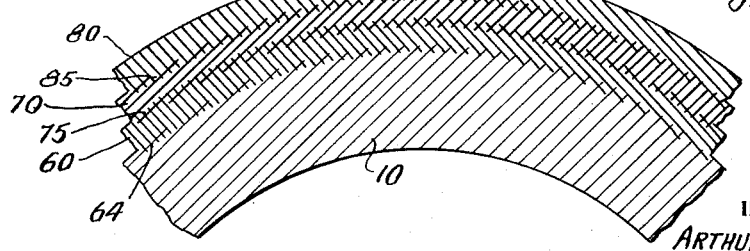
FIGURE 4 is a partial end view along section line 4—4 in FIGURE 3.

In FIGURES 3 and 4, there is illustrated a composite formed of a 304 stainless steel tube 10 having a three layer (60, 70 and 80) low carbon steel overlay provided by a welding wire equivalent to AWS Classification E-7020. In forming such a composite in order to produce overlays which will meet and in most instances, greatly surpass the most rigorous porosity standards now in effect (for example, in welds having ¼" to ½" weld thickness, a maximum of 7 pores of ³⁄₆₄" max. diameter in any 6" of weld, or a maximum of 18 pores of ¹⁄₆₄" maximum diameter in any 6" of weld), it is essential to closely control and vary the oxygen content in the inert gas shield. Thus, in forming the 1st layer 60 of weld metal, oxygen should comprise at least 1% (of total gas volume) of an argon-oxygen mixture, in forming the second overlay layer 70, the oxygen should be at least 2% of the total (where the $O_2$ was 1% by volume in the laying of the second layer high porosity welds which would not meet the welding standards were formed); and in the forming of the third layer overlay 80 and also any subsequent layers, the oxygen content should be at least 3.5% of the total gas volume. For all layers, satisfactory results have been obtained when the oxygen was as much as 10% of the total gas volume. The composites formed in this way when subjected to radiographic inspection were found to be water clear, i.e., substantially free of porosity and slag.

As can also be seen in FIGURE 3, in forming the multi-layer overlays, a subsequent layer should preferably bridge the "seam" of a lower overlay layer. Further, as can be seen in FIGURE 4, zones of penetration (64, 75 and 85) between the various overlay layers 60, 70 and 80 are of substantially uniform depth as the zone between any given layers.

Where multilayer overlays such as shown in FIGURE 3 are to be made, preferably each layer is sandblasted and wire brushed prior to the deposition of the succeeding layer.

Further, in order to modify the physicals and adjust them to meet end use requirements, it is usually necessary to subject the as welded work piece, preferably after the overlay has been rough machined to desired dimensions, to heat treatment—usually to annealing, austenizing and tempering.

Where it is desired to minimize the thickness of the weld metal overlay and still obtain the desired chemistry and physicals in the weld metal, it is possible to machine a lower layer of weld metal, before applying the next overlay of weld metal.

In this specification, the terms "weld wire," "filler wire" and "electrode" are used interchangeably.

A set of welding conditions for producing a composite such as is illustrated in FIGURE 3, which has been found to give highly satisfactory results from a production standpoint and also produce (under radiographic inspection) water clear carbon steel overlays (from a weld wire equivalent to AWS Classification E-7020) on a 304 stainless steel tube are as follows:

| Welding Conditions | Layer No. | | |
|---|---|---|---|
| | 1 | 2 | 3 |
| Length of piece (in.) | 48 | 47½ | 46¾ |
| Circumference welded on (in.) | 105⅝ | 113¾ | 121³⁄₁₆ |
| Rotational speed (i.p.m.) | 5 | 5 | 5 |
| Time per revolution (min.) | 2.13 | 2.35 | 2.56 |
| Linear speed (in./rev.) | ⅞ | ⅞ | ⅞ |
| Oscillation rate (cycles/min.) | 75 | 75 | 75 |
| Oscillation stroke (in.) | 1 | 1 | 1 |
| Torch Angle ("lead off norm.) | 10 | 10 | 10 |
| Wire diameter (in.) | ¹⁄₁₆ | ¹⁄₁₆ | ¹⁄₁₆ |
| Wire heat No. (Airco) | 1S558 | 1S558 | 1S558 |
| Electrode Extension (in.) | 2¼ | 2¼ | 2¼ |
| Nozzle to work distance (in.) | ⅝ | ⅝ | ⅝ |
| Argon flow rate (c.f.h.) | 50 | 50 | 50 |
| $O_2$ flow rate (c.f.h.) | .56 | 1.02 | 1.81 |
| Wire dial setting | 310 | 310 | 310 |
| DCRP current (amps) | 280 | 280 | 280 |
| Voltage (v.) | 31½ | 31½ | 31½ |
| Length of weld layer (in.) | 40½ | 39 | 37½ |

I claim:

1. In the method of fusion cladding employing a convelinear oscillating device in combination with an extended electrode, gas shielded metal arc welding process employing D.C. reverse polarity current, the modification which comprises forming a weld metal overlay of carbon steel on a corrosion resistant base metal selected from the group consisting of stainless steel, Monel and Inconel.

2. A method according to claim 1 wherein the weld metal is provided by a carbon steel welding wire equivalent to AWS Classification E-7020 and the base metal is a 304 stainless steel.

3. A method of fusion cladding which comprises forming an overlay of low carbon steel weld metal on a base metal in the form of a stainless steel tube having a circular cross section, said overlay being in the form of a continuous overlapping spiral of weld metal wrapped about the tube surface, said overlay being applied by a gas shielded metal arc welding process employing an extended electrode which is adapted for substantially convelinear oscillation in a direction generally parallel to the longitudinal tube axis.

4. A method according to claim 3 wherein the overlay includes a plurality of layers of weld metal.

5. A method according to claim 4 wherein the surface of a weld metal overlay layer is machined to reduce its thickness before applying the next layer of weld metal.

6. A fusion clad composite structure produced by the method of claim 1 comprising a carbon steel weld metal overlay on a corrosion resistant base metal selected from the group consisting of stainless steel, Monel and Inconel, said composite characterized in that the depth of penetration of the weld metal into the base metal is substantially uniform and is not greater than about ⅓ of the overall height of the weld metal bead and further characterized in that the weld metal is essentially defect free when subjected to radiographic inspection.

7. A composite according to claim 6 wherein the weld metal is provided by a carbon steel welding wire equivalent to AWS Classification E-7020 and the base metal is a 304 stainless steel.

8. The method according to claim 4 wherein the gas shield comprises an inert gas admixed with oxygen, the oxygen content (percent of total gas volume) being at least 1% during the application of the first layer of weld metal, and being at least 2% during the application of the second layer of weld metal and being at least 3.5% in the application of the third and any subsequent layers of weld metal.

9. In a process of forming a weld comprising a plurality of layers of low carbon steel weld metal wherein the layers are formed by the MIG technique employing an electrode extension, the improvement whereby the porosity of the weld is substantially reduced which comprises admixing oxygen with the inert gas in the following manner, the oxygen content (percent of total volume) being at least 1% during the formation of the first layer of weld metal, and being at least 2% during the application of the second layer of weld metal and being at least 3.5% in the application of the third and any subsequent layers of weld metal.

References Cited in the file of this patent

UNITED STATES PATENTS

| | | |
|---|---|---|
| 2,156,298 | Leitner | May 2, 1939 |
| 2,156,306 | Rapatz | May 2, 1939 |
| 2,427,350 | Carpenter et al. | Sept. 16, 1947 |
| 2,813,190 | Felmley | Mar. 12, 1957 |
| 3,019,327 | Engel | Jan. 30, 1962 |

FOREIGN PATENTS

| | | |
|---|---|---|
| 709,533 | Great Britain | May 26, 1954 |
| 746,023 | Great Britain | Mar. 7, 1956 |